Jan. 19, 1954     E. R. DEARBORN     2,666,283
WRAPPING MACHINE FOR IRREGULARLY CURVED ARTICLES
Original Filed Feb. 21, 1950     6 Sheets-Sheet 1

Inventor:
Ernest R. Dearborn,
by Emery, Booth, Townsend,
Miller + Neimer Attys Jan. 19, 1954  E. R. DEARBORN  2,666,283
WRAPPING MACHINE FOR IRREGULARLY CURVED ARTICLES
Original Filed Feb. 21, 1950  6 Sheets-Sheet 2

Inventor:
Ernest R. Dearborn,
by Emery, Booth, Townsend
Miller & Weidner Attys Jan. 19, 1954  E. R. DEARBORN  2,666,283
WRAPPING MACHINE FOR IRREGULARLY CURVED ARTICLES
Original Filed Feb. 21, 1950  6 Sheets-Sheet 5

Patented Jan. 19, 1954

2,666,283

UNITED STATES PATENT OFFICE 2,666,283

WRAPPING MACHINE FOR IRREGULARLY CURVED ARTICLES

Ernest R. Dearborn, Ashland, Mass., assignor to Angier Corporation, Framingham, Mass., a corporation of Massachusetts Original application February 21, 1950, Serial No. 145,454. Divided and this application October 19, 1951, Serial No. 252,169

14 Claims. (Cl. 53—104)

1

This machine relates to a machine for wrapping irregularly curved articles. By this latter expression I refer to an elongated article the longer dimension of which is not along a straight line, as exemplified by a pipe or a rolled rug or the like (cylindrical), or circular, as exemplified by a tire or a coil of wire (toruses). An example of such an article is the bumper bar of an automobile and I have herein illustrated a machine particularly adapted for wrapping bumpers and as I anticipate a major field of use of the invention for wrapping bumpers I shall, for convenience, in the following description refer to bumpers specifically as the article being wrapped. This application is a continuation in part of my application Serial No. 145,454, filed February 21, 1950, now abandoned.

My invention will be well understood by reference to the following description taken in connection with the accompanying drawings wherein:

Fig. 7 is a perspective view of the wrapping shuttle and its supporting frame;

Figures 1, 2, 3:
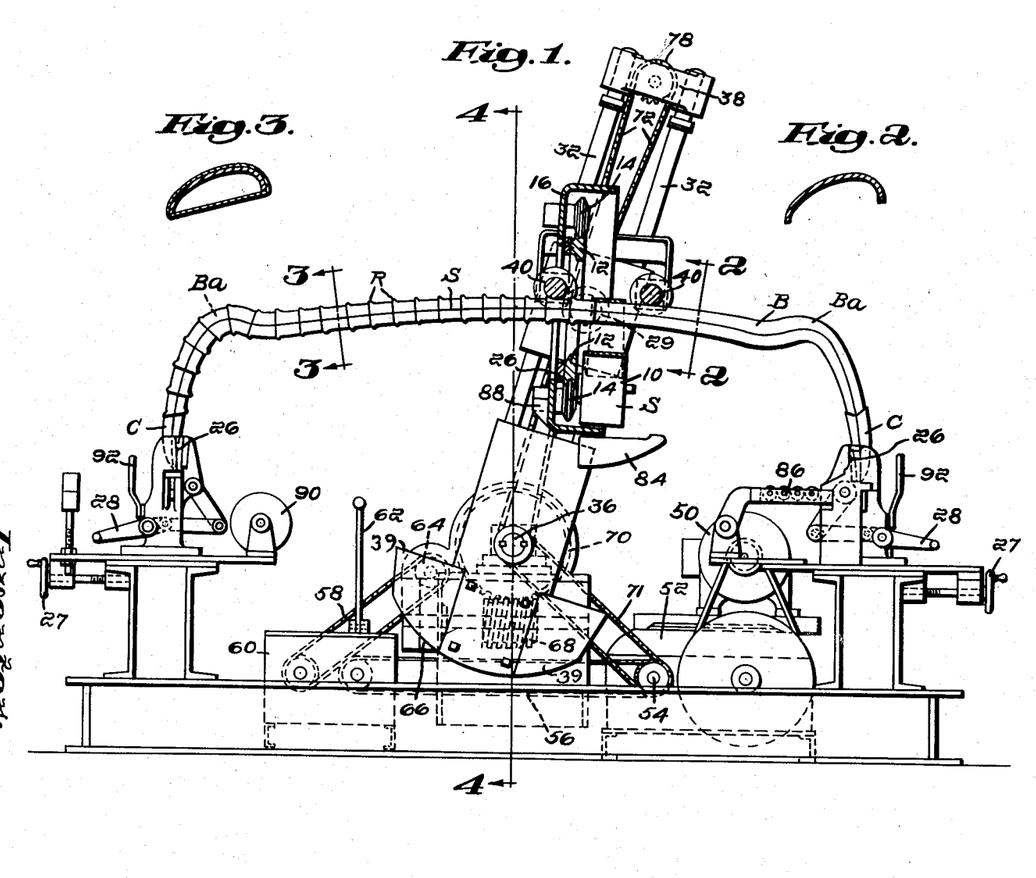
Fig. 1 is a side elevation of the machine with parts broken away and parts in section.
Figs. 2 and 3 are sections on the correspondingly numbered lines of Fig. 1.

Referring to Fig. 1 of the drawings, I there show a bumper bar B in position and partially wrapped. This particular bumper is of the type now being used on Pontiac automobiles. End caps C of paper may be folded around the ends of the bumper and an intermediate wrapping, herein of the spiral type and consisting of a series of helically applied turns of wrapping strip S, covers and binds them down. The covering is thus broadly similar to that disclosed in the patent to Angier, 1,367,650, Feb. 8, 1921. The wrapping strip S is preferably of heavy crape paper, helically applied, as in the patent to Angier, 1,282,167, Oct. 22, 1918. Herein the edges of the strip are folded over or rolled to provide a so-called rope edge indicated in Fig. 1 by the projecting wale R. This may be effected as the strip is applied by means of mechanism such as is disclosed in the patent to Wheildon, 1,692,236, Nov. 20, 1928.

The wrapping of bumpers prior to the present invention has been by hand, laboriously and slowly effected.

Figure 6:
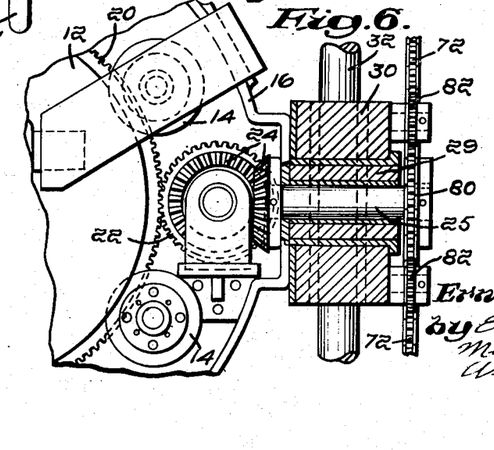
Fig. 6 is a detailed section illustrating the driving connection from the chain of Fig. 5.

The machine herein shown is of the type wherein a wrapping strip, the end of which is held against or fastened to the article when the wrapping operation is begun, is payed out to the article from (see Figs. 4 and 7) a supply roll 10 which is rotated about the article, while a relative movement of the article and supply roll transverse to the plane of rotation gives the helical wrap. Herein (see Figs. 4 and 7) the supply roll is carried on a rotary shuttle proper 12 in the form of a ring received within a group of supporting rolls 14 on a shuttle supporting frame 16 the shuttle thus being free to revolve in its own plane, and the strip is led to the bumper through suitable folding devices 18, such as those described in the Wheildon patent above referred to in the manner illustrated in Fig. 4. If the end of the strip is held and the shuttle 12 revolved about its center the supply roll is carried around the cross section of the bumper and the wrapping unwound from the roll and applied in a series of turns about the bumper. The shuttle 12 (see Fig. 6) may carry a gear 20 driven by a pinion 22 which takes motion through a pair of miter gears 24 from a drive shaft 25 which may be driven as hereinafter described.

If a revolving shuttle is used for applying a spiral wrapping to an article of circular curvature, then, in order to give a helical pitch to the wrapping, it is necessary only to rotate the article about its center in a plane perpendicular to that of the shuttle, the article passing through the eye of the shuttle as in the Angier patent above referred to. A straight or cylindrical article may be fed through the shuttle, or the shuttle may be traversed lengthwise of the articles, an arrangement sometimes used in wrapping pipes. I am aware of no machine which will effectively wrap an article of irregular curvature such as an automobile bumper.

In the machine shown the ends of the bumper B are secured by means of clamps 26 so that the bumper is supported in a vertical plane. These clamps may be mounted on the base of the machine for adjustment toward and from one another as indicated by the illustration of hand wheels 27. In the embodiment of the invention illustrated the clamps are not power operated but are opened and shut manually by the use of the hand cranks 28. Detailed description is unnecessary as the operating connections from the handles 27 and 28 may be of any suitable form and their exact construction is not material. The shuttle rotates about its center and around the cross section of the bumper in a plane relatively perpendicular thereto. To lay the strip helically about the bumper the shuttle is given two movements. The first is a bodily movement of the shuttle and its supporting frame in a path, which herein is a circular arc, approximating the longitudinal contour of the bumper. The shuttle and its supporting frame are also given a movement transverse to this path to modify the resulting movement of the shuttle so that the latter is at all times approximately centered about the cross section of the bumper and closely follows its contour as the latter departs from the circular.

Figure 4:
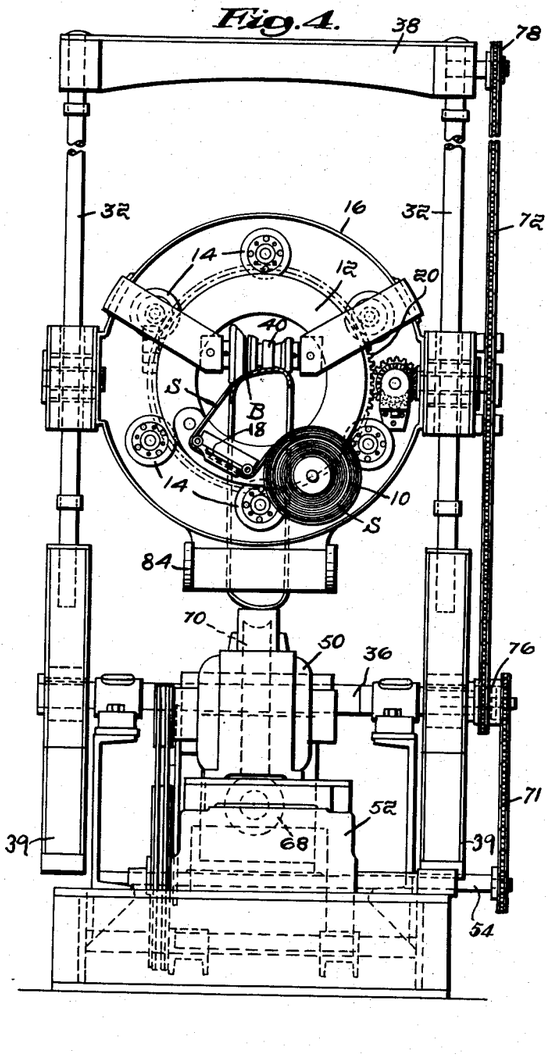
Fig. 4 is a section on the line 4—4 of Fig. 1 except that the shuttle carrier and its actuating arm which appear somewhat to the right of center in Fig. 1 appear in Fig. 4 in a central position.
Figure 5:
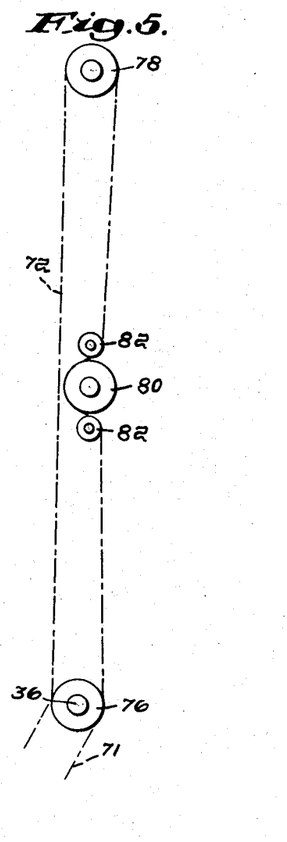
Fig. 5 is a diagrammatic view illustrating the lead of a driving chain utilized in the machine as seen from the right of Fig. 4.

To avoid misunderstanding it may be noted here that the folding and guiding mechanisms 18 for the strip S, which are seen in Figs. 4 and 7, do not appear in Figs. 1, 8, 9 and 10 since they are on the nearer side of the sectioning plane. The dotted lines indicate the course of the wrapping strip between the supply roll 10 and the bumper where the actual strip is cut away. So far as the mere principle of paying out the wrapping strip is concerned the strip might lead direct from the supply roll to the bumper if the former were properly braked to provide for proper paying out of the strip as has indeed been done in tire wrapping machines. The foundation of the helical wrap may perhaps be better visualized in connection with such figures as 1, 8, 9 and 10 if the dotted path is thought of as if it were the actual strip so leading from the supply roll to the bumper.

Herein the shuttle supporting frame 16 is provided at diametrically opposite points with trunnions 29 (see Fig. 6) journalled in pillow blocks 30 each block sliding on a pair of rods 32 which pairs form a part of the respective sides of a carrier designated as a whole by the numeral 34. This carrier is a swinging arm pivoted on a centrally located shaft 36 extending transversely to the plane of the bumper. The two pairs of rods extend at either side of that plane and they are here shown as connected at their distal ends by a cross member 38, and suitable counterweights 39 are provided at the lower end of the arm at each side. As the carrier swings from one end of the bumper to the other through the position shown in Fig. 1, it carries the shuttle 12 and its supporting frame 16 from one end of the bumper to the other. During this movement the shuttle with its supporting frame is, by means hereinafter described, moved inwardly and outwardly along the rods 32 as the contour of the bumper requires. In the embodiment of the invention shown the bumper itself is utilized in the manner of a cam. The shuttle supporting frame 16 carries follower rolls 40 at either side thereof which ride on the bumper. As the carrier arm 34 swings the reaction between these rolls and the bumper B moves the shuttle in and out so that it follows the contour of the bumper and is approximately centered relatively to the cross section of the bumper in all points of its travel. Since the shuttle carrier is trunnioned in the sliding blocks 30, it can move on its trunnions 29 and thus the plane of rotation of the shuttle is perpendicular to the connecting line between the two rolls 40 and as these traverse the curve of the bumper the plane of the shuttle is substantially perpendicular to the axis of the bumper at all points, as has been above stated.

The parts of the machine here shown are driven from a motor 50 preferably through the variable speed drive of conventional construction in casing 52 and having an output shaft 54. Driving bands 56 and 58 between which is interposed a reversing mechanism 60 having an operating handle 62 oscillate the arm 34 through a double worm reduction comprising a worm 64, worm wheel 66, worm 68 on the shaft of the latter, and worm wheel 70 on the supporting shaft 36 for the arm. For revolving the shuttle a chain 71 drives from shaft 54 a chain 72 extending between the sprocket 76 mounted coaxially with the center line on the shaft 36 and a sprocket 78 carried by the cross member 38 of the swinging arm. One side of this chain meshes with a sprocket 80 on the miter gear shaft 25 which extends through and is journalled in one of the trunnions 29 and is held in mesh with the same by the binder sprockets 82. This arrangement permits the shuttle to be continuously driven while it is moving up and down along the rods 32 without material variation in its speed.

A machine having the parts so far described is complete and it is therefore appropriate here briefly to describe the method of operation before referring to certain additions or refinements which are also illustrated.

In use a bumper is passed through the shuttle and secured by the clamps 26 as shown in Fig. 1. The end caps C are applied by hand to the bumper ends before they are placed in the clamps. The arm 34 being, for example, in the extreme left-hand position viewing Fig. 1, one end of the strip S is held against the left-hand cap and the machine started. The second turn of the spiral wrapping will bind down the end which may then be released. The arm swings clockwise through the position of Fig. 1 to an extreme right-hand position, paying out the strip as it goes and applying it as a spiral or helix around the bumper. This wrapping overlaps on and covers the right-hand end cap C as the wrapping is finished. When the machine is stopped the strip is severed and the end secured. The clamps are opened and the bumper which has just been wrapped is now removed, another inserted and clamped and the arm 34 swung back from right to left to apply another wrapping. The helical pitch of this will be opposite to that of the bumper wrapped when the arm was swinging from left to right, but this is not material. The starting and stopping of the machine may be effected by any suitable manually or automatically operated switch mechanism not necessary to show. It may be noted that in its extreme positions the shuttle is near the horizontal and closely adjacent one of the clamps 26. Only a short length of the bumper need be passed through the eye of the shuttle by a simple downward movement into the open jaws of the clamps.

Referring to Fig. 1 of the drawing, it will be noted that in the particular bumper illustrated there is a reverse curve on either side, forming the projections Ba. As the shuttle carrier 16 moves toward these projections they present relatively bluff faces to the follower rolls 40. In the example of the invention illustrated the trailing roll in moving toward the right in Fig. 1 surmounts the projection with some difficulty as hereinafter more particularly explained. Therefore, in the case of these or similar local irregularities which might place an even greater impediment to the smooth operation of the machine, it is desirable to provide means for easing the followers over such an obstruction, and for this purpose an auxiliary cam means may be provided which takes over from the cam provided by the bumper itself at this point.

Figure 8:
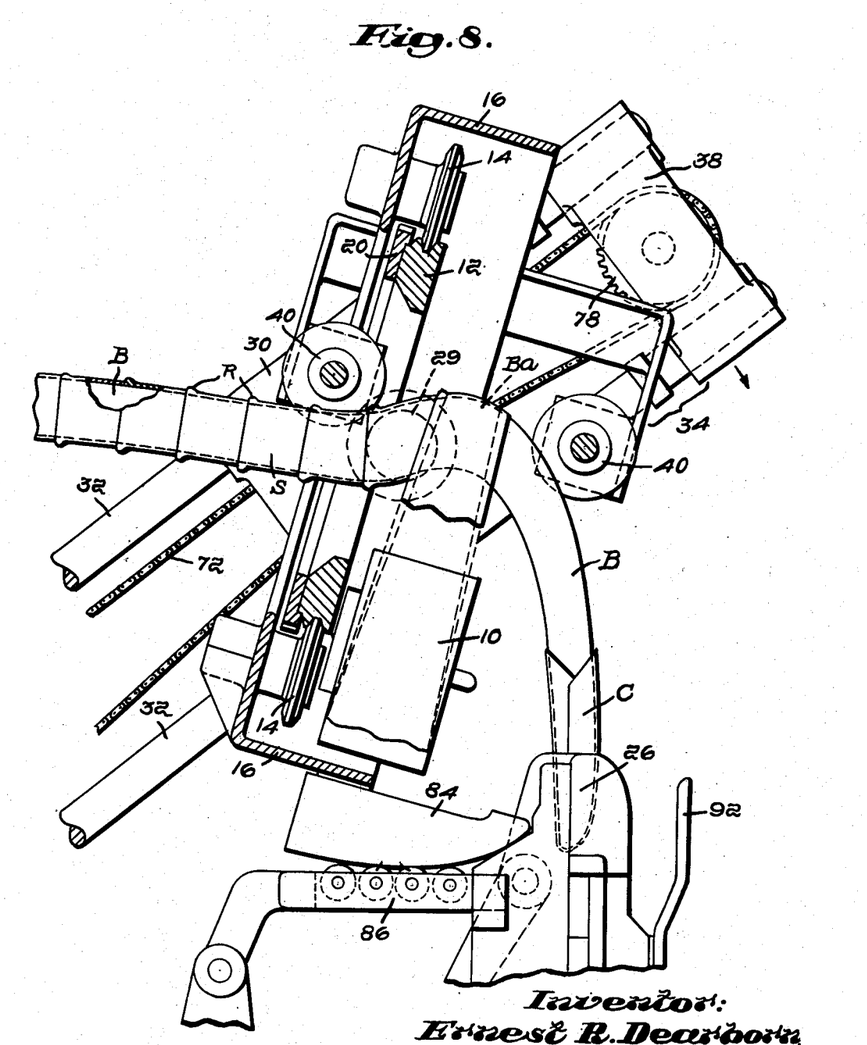
Fig. 8 is a fragmentary view partly in section showing the wrapping mechanism in a position which it occupies shortly before it reaches the right-hand extreme position viewing Fig. 1.

Referring to Fig. 1, in the machine illustrated it will be noted that the left-hand follower roll 40 is placed with its center between the two guiding rods 32 and closely adjacent the center of trunnion 29, this being possible because the flanges of the roll may be partially accommodated within the hollow center of the shuttle. On the other hand, in the case of the right-hand follower roll 40, in order to accommodate the supply roll 10 and the guiding means for the strip, the center of the follower roll is placed outwardly from the adjacent guide rod and relatively remote from the trunnion. As the shuttle carrier moves toward the right, from the position of Fig. 1 toward the position of Fig. 8, when the leading roll 40 encounters the projection B$a$ it tends to stall against the projection B$a$. However, when the leading roll has passed the projection, it comes to a position where the line of the bumper is relatively vertical and gives it little support in the vertical plane, and the shuttle can tilt and ease the trailing roll over the obstruction. The auxiliary cam means illustrated in Fig. 8 is arranged to lift the leading follower roll when it comes to projection B$a$. This auxiliary cam means comprises fixed cam elements 84 secured to the shuttle supporting frame 16 and having the general form of half a circular segment. Suitably positioned to be engaged by the cam members 84 as the leading follower roll 40 approaches the obstruction B$a$ from the left, is a cooperating roller bed 86, that is to say, a series of rollers onto and over which the cam surfaces may move. As a result of this arrangement the shuttle carrier 16 is eased over the obstruction B$a$ because these cam elements 84 will take most of the weight and, in the embodiment shown, actually lift the leading follower roll 40 clear of the bumper until the roll has passed the obstruction. When the shuttle carrier moves toward the left viewing Fig. 1, such a mechanism is not called for. The leading roll approaches the obstruction with the two rollers on a substantially even keel and surmounts the obstruction easily enough. The trailing roller being situated remote from the trunnion 29 also passes easily and no adventitious aid is necessary or desirable.

Figure 9:
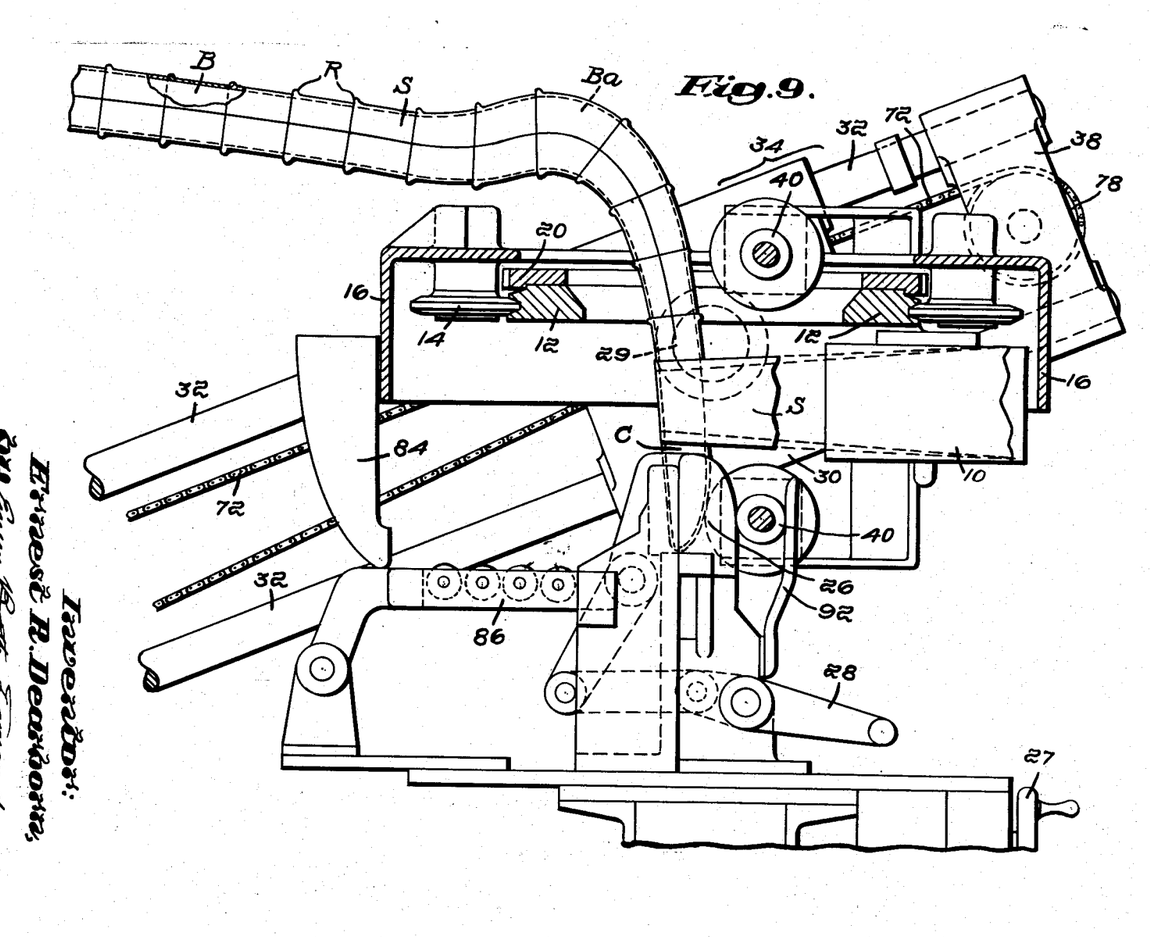
Fig. 9 is a fragmentary view partly in section showing the wrapping mechanism at the extreme of its movement, toward the right.
Figure 10:
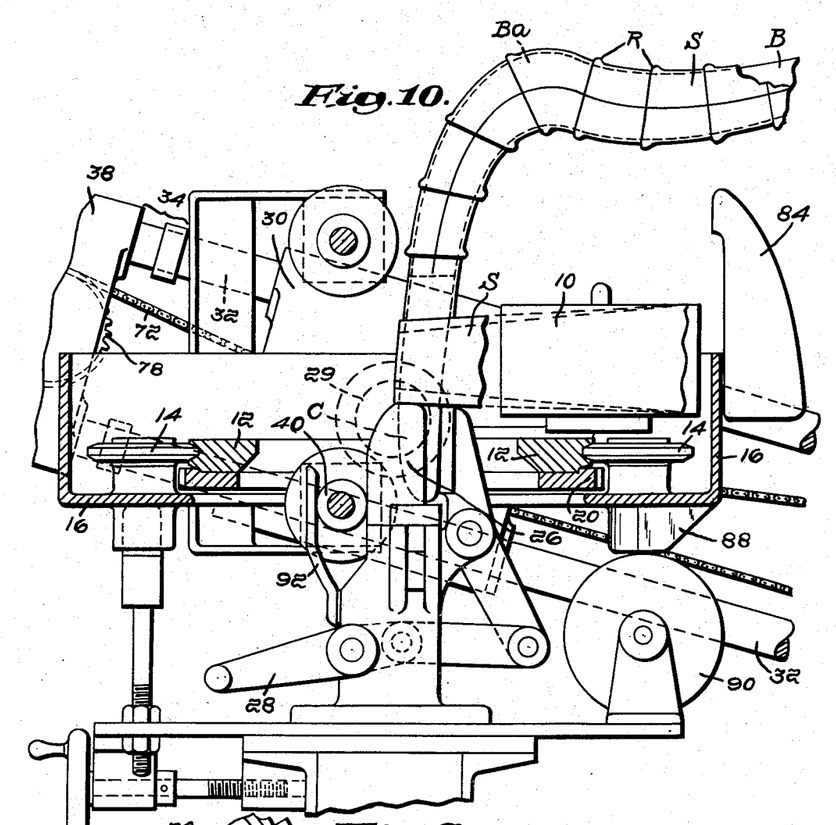
Fig. 10 is a similar view with the parts in extreme left-hand position viewing Fig. 1.

At the conclusion of the wrapping operation it is desirable to remove the follower rolls 40 from the bumper to facilitate the removal of the bumper from the clamps 26. The arrangements for this are shown in Figs. 9 and 10 respectively for the right and left-hand ends of the bumper viewing Fig. 1. In the former case the cam elements 84 are utilized. Shortly after the parts move past the position of Fig. 8 the right-hand ends of these cam segments 84 will engage the frame of the machine and as the arm 34 continues its movement clockwise, viewing the figure, the segments will roll back along the roller bed 86 toward the position shown in Fig. 9 where their ends rest upon the frame of the roller bed and support the left-hand end of the shuttle carrier 16 in that figure at a fixed elevation. By the movement thus effected the leading roll is guided into the open throats of hooks 92 when it passes the clamps 26 and the spiral wrapping of the bumper is completed at this end and the trailing roller is tilted toward the right, away from the bumper, freeing it from the bumper so that the latter may be readily removed by a vertical lifting movement when the clamp is opened.

At the left-hand end of the machine, as indicated in Fig. 10, fixed cam surfaces 88 on the back of the shuttle carrier 16 may ride into cooperation with rollers 90 on the base of the machine, setting up a similar tilting movement whereby, when the leading roll is positioned within the hooks 92, the trailing roll 40 is tilted away from the bumper.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A wrapping machine for an irregularly curved article comprising spaced supporting means for supporting the article at its ends, a rotary wrapping shuttle for encircling the intermediate portion of the article between its ends, a supporting frame for the shuttle, a carrier for the frame, means for moving the carrier to carry the shuttle through a path approximating the longitudinal contour of the article, the supporting frame being mounted on the carrier for relative movement thereon transversely of said path, and a follower carried by the frame for cooperating with a guiding surface for transversely positioning the shuttle substantially centrally to the article as it moves along the same.

2. A wrapping machine for an irregularly curved article comprising spaced supporting means for supporting the article at its ends, a rotary wrapping shuttle for encircling the intermediate portion of the article between its ends, a supporting frame for the shuttle, a carrier for the frame, means for moving the carrier to carry the shuttle through a path approximating the longitudinal contour of the article, the supporting frame being mounted on the carrier for relative movement thereon transversely of said path, and a follower carried by the frame normally contacting the supported article to be positioned thereby.

3. A wrapping machine for an irregularly curved article comprising spaced supporting means for supporting the article at its ends, a rotary wrapping shuttle for encircling the intermediate portion of the article between its ends, a supporting frame for the shuttle, a carrier for the frame, means for moving the carrier to carry the shuttle through a path approximating the longitudinal contour of the article, the supporting frame being mounted on the carrier for relative movement thereon transversely of said path, a follower carried by the frame apposing the supported article to be positioned thereby, and means adjacent at least one of said spaced points for lifting the follower from the article as the shuttle approaches the same to facilitate the removal of the article from the clamps.

4. A wrapping machine for an irregularly curved article comprising spaced supporting means for supporting the article at its ends, a rotary wrapping shuttle for encircling the intermediate portion of the article between its ends, a supporting frame for the shuttle, a carrier for the frame, means for moving the carrier to carry the shuttle through a path approximating the longitudinal contour of the article, the supporting frame being mounted on the carrier for relative movement thereon transversely of said path and also for swinging movement thereon about an axis transverse to said path and a follower carried by the frame for cooperating with a guiding surface for transversely positioning the shuttle substantially centrally to the article and substantially in a plane perpendicular thereto as it moves along the same.

5. A wrapping machine for an irregularly curved article comprising means for supporting the article at spaced points, a rotary wrapping shuttle for encircling the article between said points, a supporting frame for the shuttle, a carrier for the frame, means for moving the carrier to carry the shuttle through a path approximating the longitudinal contour of the article, the supporting frame being mounted on the carrier for relative movement thereon transversely of said path, and also for swinging movement about an axis transverse to said path and a pair of followers carried by the frame at opposite sides of the shuttle for cooperating with a guiding surface for transversely positioning the shuttle substantially centrally to the article and substantially in a plane perpendicular thereto as it moves along the same.

6. A wrapping machine for automobile bumpers and like irregularly curved articles comprising a pair of clamps for engaging the ends of the bumper to support it in a vertical plane, a shaft transverse to the plane, an arm oscillated by the shaft lengthwise of the bumper, a device for dispensing wrapping strip to the article in covering relation thereto, said device being mounted on the arm for sliding movement therealong and a follower carried by said device normally contacting to the bumper to run on the surface of the same.

7. A wrapping machine for an irregularly curved article comprising means for supporting the article at spaced points, a device for dispensing a wrapping strip to the article in covering relation thereto, a driven carrier for said device which moves it through a path approximating the longitudinal contour of the article, the device being mounted on said carrier for movement relative to the carrier transverse to the said path and a follower carried by said device for cooperating with a guiding surface for transversely positioning the device substantially centrally to the article as it moves along the same.

8. A wrapping machine for an irregularly curved article comprising means for supporting the article at spaced points, a device for dispensing a wrapping strip to the article in covering relation thereto, a driven carrier for said device which moves it through a path approximating the longitudinal contour of the article, the device being mounted on said carrier for movement relative to the carrier transverse to the said path and follower means on said device riding on the article to give the latter the second mentioned movement.

9. A wrapping machine for an irregularly curved article comprising means for supporting the article at spaced points, a device for dispensing a wrapping strip to the article in covering relation thereto, a driven carrier for said device which moves it through a path approximating the longitudinal contour of the article, the device being mounted on said carrier for movement relative to the carrier transverse to the said path, follower means on said device riding on the article to give the latter the second mentioned movement and means adjacent at least one of said points to be engaged by said device as it approaches the same for moving the follower away from the article to facilitate the removal of the article from the clamps.

10. A wrapping machine for an irregularly curved article comprising means for supporting an article at spaced points, a swinging arm comprising guide rods extending at either side of the article so supported, pillow-blocks slidable on the rods, a shuttle-carrying frame trunnioned in the pillow-blocks, a ring-shaped wrapping shuttle rotatably supported in the frame, follower rolls carried by the frame at opposite sides of the plane of the shuttle for cooperation with a guiding surface, and driving means for swinging the arm and rotating the shuttle.

11. A wrapping machine for an irregularly curved article comprising means for supporting the article at spaced points, a device for dispensing a wrapping strip to the article in covering relation thereto, a driven carrier for said device which moves it through a path approximating the longitudinal contour of the article, the device being mounted on said carrier for movement relative to the carrier transverse to the said path, follower means on said device riding on the article to give the latter the second mentioned movement and cooperating parts carried by said device and a fixed portion of the machine respectively which parts engage one another at an intermediate point in the travel of the device and are shaped to move the device transversely to the length of the bumper independently of the follower means.

12. A wrapping machine for automobile bumpers and like articles of irregular curvature comprising a dispensing device from which the wrapping material is dispensed to the bumper in covering relation thereto and means for giving the same a movement relative to the bumper compounded of a movement longitudinal of the same and a movement transverse to the length of the same to maintain the dispensing device during the wrapping operation in substantially constant relation to the cross section of the bumper at every point of its length, said means including a power-driven traversing means for effecting the first movement and means for developing a reactive force from the first movement to effect the second.

13. A wrapping machine for automobile bumpers and like articles of irregular curvature comprising a dispensing device from which the wrapping material is dispensed to the bumper in covering relation thereto and means for giving the same a movement relative to the bumper compounded of a movement longitudinal of the same and a movement transverse to the length of the same to maintain the dispensing device during the wrapping operation in substantially constant relation to the cross section of the bumper at every point of its length, said means including a power-driven traversing means for effecting the first movement and means for developing by the bumper itself a reactive force from the first movement to effect the second.

14. A wrapping machine for automobile bumpers and like articles of irregular curvature comprising a dispensing device from which the wrapping material is dispensed to the bumper in covering relation thereto and means for giving the same a movement relative to the bumper compounded of a movement longitudinal of the same and a movement transverse to the length of the same to maintain the dispensing device during the wrapping operation in substantially constant relation to the cross section of the bumper at every point of its length, said means including a power-driven traversing means for effecting the first movement and means for developing by the bumper itself a reactive force from the first movement to effect the second and a fixed element adjacent the path and cooperating with the dispensing device to shift the latter independently of the reactive force developed from the bumper.

ERNEST R. DEARBORN.

References Cited in the file of this patent

UNITED STATES PATENTS

| Number | Name | Date |
| --- | --- | --- |
| 2,074,892 | Derry | Mar. 23, 1937 |
| 2,253,891 | Cummings | Aug. 26, 1941 |
| 2,360,960 | Martindell | Oct. 24, 1944 |
| 2,370,780 | Cram | Mar. 6, 1945 |
| 2,415,500 | Kennison | Feb. 11, 1947 |
| 2,471,580 | Perrault | May 31, 1949 |